Patented July 30, 1946

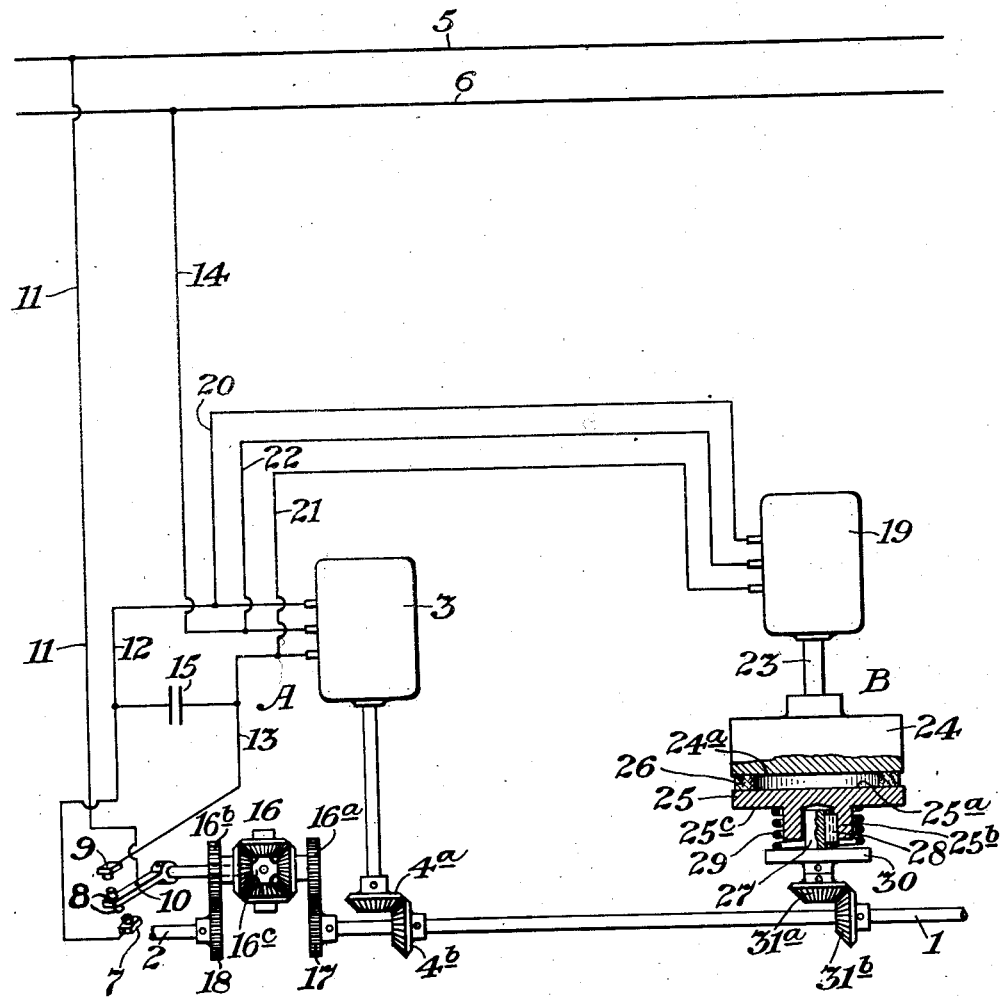

2,405,017

UNITED STATES PATENT OFFICE 2,405,017

DAMPING MECHANISM

Raymond E. Crooke, Little Neck, N. Y., assignor to Ford Instrument Company, Inc., Long Island City, N. Y., a corporation of New York Application August 18, 1938, Serial No. 225,536

4 Claims. (Cl. 172—239)

The invention herein disclosed relates to an arrangement for maintaining, within predetermined limits, the rate of change of speed of a driven member actuated by a prime mover that is subject to variable energization and capable of accelerating the driven member beyond permissible limits.

In certain arrangements, systems and instruments, it is frequently desirable to drive a driven element or mechanism in accordance with an output of some other mechanism, but the driven element requires more power than is available. Under such conditions it is common to use a follow-up system in which the driven element is actuated by a prime mover that is energized in accordance with the difference in movement of the driven element and the output shaft, the movement of which it is desired to reproduce in the driven member. In some instruments, the output element or shaft which controls the follow-up, has a jerky, oscillatory movement and the follow-up prime mover is variably energized causing undesirable rates of change of speed in the driven element.

The object of this invention is to provide an arrangement of this type in which, irrespective of the variable energization of the prime mover, the rate of change of movement of the driven member is held within certain, predetermined limits. In this way the jerky movements of the element, the movement of which is to be reproduced in the driven member, are smoothed out and the driven member held within predetermined rates of change of speed. This is accomplished in accordance with the invention by providing a power-driven inertia element that is connected to the driven element. The inertia element is driven by a prime mover that has a power output only sufficient to accelerate the inertia element within predetermined limits. When the driven element attempts to exceed these limits it is loaded with the inertia element and also the inertia of the rotor of the prime mover that drives the inertia element. So loaded, the driven element is held within predetermined rates of change of speed.

While in the single figure of the drawing a follow-up system embodying the invention has been diagrammatically illustrated, it will be appreciated that the invention has other applications.

In the arrangement illustrated in the drawing there is a follow-up system designated generally by the letter A, and a power-driven inertia mechanism designated generally by the letter B. The function of the follow-up system is to drive a driven member, represented by a shaft 1, in accordance with the movements of a shaft 2 which may, for example, be the output shaft of a computing mechanism. The function of the inertia mechanism is to load the shaft 1 when the rate of change of speed of the shaft exceeds a predetermined limit, a limit that it is desirable, for the purpose for which the system is used, not to exceed.

The follow-up system includes a prime mover 3, illustrated as an electric motor, for driving the shaft 1. To this end, the motor 3 is connected to the shaft 1 through a pair of bevel gears, one 4a mounted on the shaft of the motor and the other 4b mounted on the shaft 1. The motor is energized from line wires 5 and 6 through contacts 7, 8 and 9. Contacts 7 and 9 are stationary and contact 8 is mounted on a movable arm 10 operable to move contact 8 between contacts 7 and 9. Contact 8 is connected to line wire 5 through a conductor 11 and contacts 7 and 9 are connected to the motor 1 by conductors 12 and 13 respectively. The motor is also connected to line wire 6 through a conductor 14. A condenser 15 is connected across conductors 12 and 13. With this arrangement, the motor 3 operates in one direction when contacts 7 and 8 are engaged and in the opposite direction when contacts 8 and 9 are engaged, the motor being deenergized when contact 8 is between contacts 7 and 9.

Contact arm 10 is actuated to effect contact between contact 7 and 8 or 8 and 9 upon a difference in position between shafts 1 and 2. Such movement of arm 10 is accomplished by a differential 16. One side 16a of the differential is connected to the shaft 1 through a gear 17 mounted on the shaft 1 and the other side 16b of the differential is connected to shaft 2 through a gear 18. The center 16c of the differential is connected to actuate the contact arm 10. In the manner well known in differentials, the center of the differential is actuated in accordance with the difference in movement of the sides of the differential. Thus, in the arrangement shown when shaft 2 rotates the center of the differential will rotate and contact 8 will engage either contact 7 or 9 depending upon the direction of rotation of shaft 2. Motor 3 will be energized and rotate shaft 1 until it has rotated the same amount as shaft 2 when contact 8 will be moved between contacts 7 and 9.

The inertia arrangement B includes a prime mover 19 also illustrated as an electric motor. It is connected to conductors 12, 13 and 14 by conductors 20, 21 and 22 respectively so that it is energized simultaneously with motor 3. The shaft 23 of the motor 19 has secured to the end thereof for rotation therewith an inertia element 24. Between the face 24a of the inertia element and the face 25a of a plate 25, there is an annular friction drive ring 26 made of cork or similar material. The plate 25 has a hub 25b that is splined to a shaft 27 through a key 28 for rotation therewith but free to move, a limited amount, axially thereof. The plate is resiliently urged into contact with the friction ring 26 by a spring 29 acting between the face 25c of the plate and a collar 30 secured on shaft 27. Shaft 27 is connected to shaft 1 through a pair of bevel gears 31a and 31b secured respectively on to shafts 27 and 1. The size of the inertia element 24 is such with respect to the motor 19 that motor 19 can vary the rate of change of movement of the inertia element only within a predetermined limit. The motor 3 is, however, capable of varying the rate of change of movement of the shaft 1 beyond the predetermined limit. When motor 3 drives shaft 1 such that the rate of change of movement is greater than the ability of motor 19 to drive the inertia element, shaft 1 is loaded with the inertia element and the inertia of the rotor of the motor 19. If the variation be great enough, slippage may occur in the friction drive connection between the inertia element 24 and plate 25, but this acts as a brake tending to hold shaft 1 within the permissible rate of change of movement.

From the foregoing it will be seen that there is provided by the invention an arrangement whereby a driven element may be accelerated or decelerated freely within certain limits, but in which the driven element is loaded when it tends to a rate of change of movement in excess of predetermined limits. Also with the arrangement illustrated the torque of the motor that drives the inertia element may add to the torque of the motor driving the driven element in the event that the load on the driven element should exceed the power of the driving motor within the permissible rate of acceleration. In other words, the inertia mechanism intermittently resists and aids movement of the driven element as the electrical contacts are made and broken in response to a moving signal. Likewise the friction drive arrangement places a load on the driven element during intermittent oscillations which it is desired to smooth out.

It will be obvious that various changes may be made by those skilled in the art in the details of the embodiment of the invention illustrated in the drawing and described above within the principle and scope of the invention as expressed in the appended claims.

I claim:

1. In a mechanism for maintaining within predetermined limits the rate of change of speed of a driven member actuated by a prime mover subject to variable energization and capable of accelerating the driven element beyond permissible limits, the combination comprising a driven element, a prime mover connected to drive the driven element and capable of accelerating the driven element beyond desirable limits, an inertia element for limiting the rate of change of speed of the driven element, a friction driving connection between the driven element and the inertia element, and another prime mover connected to drive the inertia element, said second mentioned prime mover having a power output only sufficient to accelerate the inertia element within predetermined limits.

2. In a mechanism for maintaining within predetermined limits the rate of change of speed of a driven member actuated by a prime mover subject to variable energization and capable of accelerating the driven element beyond permissible limits, the combination comprising a driven element, a prime mover connected to drive the driven element and capable of accelerating the driven element beyond desirable limits, an inertia element for limiting the rate of change of speed of the driven element, a friction driving connection between the driven element and the inertia element, another prime mover connected to drive the inertia element, said second mentioned prime mover having a power output only sufficient to accelerate the inertia element within predetermined limits, and means for simultaneously energizing the prime movers.

3. In a mechanism for maintaining within predetermined limits the rate of change of speed of a driven member actuated by a prime mover subject to variable energization and capable of accelerating the driven element beyond permissible limits, the combination comprising a driven element, a prime mover connected to drive the driven element and capable of accelerating the driven element beyond desirable limits, an inertia element for limiting the rate of change of speed of the driven element, a yieldable drag connection between the driven element and the inertia element, and another prime mover connected to drive the inertia element, said second mentioned prime mover having a power output only sufficient to accelerate the inertia element within predetermined limits.

4. In a mechanism for maintaining within predetermined limits the rate of change of speed of a driven member actuated by a prime mover subject to variable energization and capable of accelerating the driven element beyond permissible limits, the combination comprising a driven element, a prime mover connected to drive the driven element and capable of accelerating the driven element beyond desirable limits, an inertia element connected to the driven element for limiting the rate of change of speed thereof, another prime mover connected to drive the inertia element, said second mentioned prime mover having a power output only sufficient to accelerate the inertia element within predetermined limits, a control switch connected to a source of power and to the prime movers in parallel relation to each other, and means connected to the driven element for moving the control switch, whereby the prime movers are simultaneously energized in parallel and controlled by the driven element.

RAYMOND E. CROOKE.